United States Patent
Pham

(10) Patent No.: US 12,060,941 B2
(45) Date of Patent: Aug. 13, 2024

(54) SEGMENTED SEAL PUZZLE JOINT SEAL

(71) Applicant: Parker-Hannifin Corporation, Cleveland, OH (US)

(72) Inventor: Linh T. Pham, Chula Vista, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 734 days.

(21) Appl. No.: 16/822,461

(22) Filed: Mar. 18, 2020

(65) Prior Publication Data
US 2020/0340584 A1 Oct. 29, 2020

Related U.S. Application Data

(60) Provisional application No. 62/837,350, filed on Apr. 23, 2019.

(51) Int. Cl.
*F16J 15/08* (2006.01)
*F16J 15/06* (2006.01)

(52) U.S. Cl.
CPC ......... *F16J 15/0818* (2013.01); *F16J 15/067* (2013.01)

(58) Field of Classification Search
CPC ........ F16J 15/067; F16J 15/122; F16J 15/104; F16J 15/0818
See application file for complete search history.

(56) References Cited

U.S. PATENT DOCUMENTS

| 1,986,465 | A | | 1/1935 | Dempsey | |
|---|---|---|---|---|---|
| 3,738,670 | A | * | 6/1973 | Jelinek | F16J 15/067 277/632 |
| 4,580,793 | A | * | 4/1986 | Bronson | F16J 15/3488 277/547 |
| 5,149,109 | A | * | 9/1992 | Jelinek | F16J 15/067 277/632 |
| 5,236,203 | A | * | 8/1993 | Uchida | F01M 11/0004 277/591 |
| 5,618,047 | A | * | 4/1997 | Belter | B29C 45/26 277/632 |

(Continued)

FOREIGN PATENT DOCUMENTS

| DE | 102015121824 | A1 | | 6/2017 | |
|---|---|---|---|---|---|
| DE | 102018204085 | A1 | * | 9/2019 | .......... F16J 15/0818 |
| EP | 0900929 | A1 | | 3/1999 | |

OTHER PUBLICATIONS

Antimony carbon graphite segmented seal ring for coal mill; Frank Chen; Xiangyang Kington Seals Co., Ltd.; https://www.alibaba.com/product-detail/Antimony-carbon-graphite-segmented-seal-ring_60762700239.html; obtained Oct. 8, 2018.

*Primary Examiner* — Eugene G Byrd
(74) *Attorney, Agent, or Firm* — Renner, Otto, Boisselle Sklar, LLP

(57) ABSTRACT

A segmented sealing assembly includes a first sealing segment having a first resilient sealing element with a first primary sealing surface and a tongue having a secondary sealing surface, and a second sealing segment having a second resilient sealing element with a second primary sealing surface and a groove having another secondary sealing surface. The first and second sealing segments are movable into a contact engagement to form the sealing assembly. When the first and second sealing segments are moved into the contact engagement, the first and second primary sealing surfaces form a primary seal, and the tongue and the groove form a secondary seal.

18 Claims, 8 Drawing Sheets

(56) References Cited

U.S. PATENT DOCUMENTS

| | | | |
|---|---|---|---|
| 5,906,377 A * | 5/1999 | Salameh | F16B 3/00 |
| | | | 277/632 |
| 6,308,960 B1 * | 10/2001 | Peale | H04R 9/00 |
| | | | 181/199 |
| 6,553,664 B1 | 4/2003 | Schenk | |
| 9,759,327 B2 | 9/2017 | Olivas | |
| 2014/0319782 A1 * | 10/2014 | Mohammad | F16J 15/14 |
| | | | 277/637 |
| 2016/0091093 A1 | 3/2016 | Lee | |
| 2020/0408303 A1 * | 12/2020 | Gruhler | F16J 15/067 |

* cited by examiner

SEGMENTED SEAL PUZZLE JOINT SEAL

RELATED APPLICATIONS

This application claims the benefit of U.S. Provisional Application No. 62/837,350 filed Apr. 23, 2019, which is hereby incorporated herein by reference.

FIELD OF INVENTION

The present invention relates to sealing assemblies particularly suitable for sealing flanged hardware joints, and more particularly to segmented seals that may be employed for sealing large flanged hardware joints as may be present, for example, in large perimeter containers.

BACKGROUND

The need for effective sealing of flanged hardware joints arises in many applications. An example of a typical flanged hardware joint is the junction between a container and a corresponding container lid. Another potential application may be the joining of relatively large tubular sections. The difficulty in achieving an effective seal increases for large flanged hardware joints in which the joint components may have a significantly large perimeter. For example, in certain storage applications, a container may be configured as a cylindrical container with a diameter of approximately seven to eight feet (or thereabout).

At such diameters (or more generally perimeters as comparable principles would apply to any shape container), it is difficult to achieve adequate sealing with a unitary sealing component. A unitary sealing component of such size may be subject to wear and cracking as it lacks stability and can be likely to move during use, and can be unwieldy to install.

One alternative to installing a unitary sealing component is to generate a substantially uniform sealing element using a sealing process known in the art as Room Temperature Vulcanization (RTV). In RTV sealing, a sealing material is initially applied to the flanged hardware joint in a high-viscous state by spraying, gunning (like a glue gun type application), or like application process. Due to the properties of the RTV material, the material cures over time in exposure to air to form a more solid-state elastomeric seal. Although RTV sealing can provide an effective seal, the process has several drawbacks. RTV sealing can be messy, and the RTV materials may be volatile in the application state requiring protective measures to prevent inhalation by users or combustion. In addition, the RTV material is not reusable rendering the container difficult to maintain. Accordingly, should the need arise to open and re-close a container sealed with RTV, the old RTV material must be scraped away and the RTV process must be performed again in its entirety to close and re-seal the container.

Another option for sealing large flanged hardware joints has been to provide segmented sealing assemblies rather than a unitary sealing component. With dividing the overall sealing structure into segments, each sealing segment is easier to install, and each segment tends to be more stable than a unitary sealing component, reducing movement and associated wear. The boundaries between the segments, however, result in gaps that constitute locations of potential leakage. In conventional configurations, the gaps often are sealed using RTV sealing. Although the amount of RTV sealing is reduced for segmented sealing assemblies as compared to using RTV sealing alone, any use of RTV still suffers to a significant degree from the drawbacks referenced above.

SUMMARY OF INVENTION

The present invention provides an enhanced segmented sealing assembly for a large perimeter flanged hardware joint, which provides an effective seal without using RTV sealing at the gaps between the sealing segments. The segmented sealing assembly combines a plurality of sealing segments to form the overall sealing assembly. Such a segmented sealing assembly may seal any first or interior area bounded by the sealing assembly from a second or exterior area, and is assembled from two or more of the sealing segments to create the single sealing assembly.

Each sealing segment may include a rigid retainer element (e.g., a metal, reinforced plastic, composite or other suitable retainer material), over-molded with a resilient sealing element. The resilient sealing element may be formed on a perimeter of the corresponding sealing segment, and the resilient sealing elements may form a primary seal of the segmented sealing assembly. The sealing segments each include secondary sealing elements that form a tongue and groove connection having complementary tapered or wedged profiles that are compressed during use. The tongue and groove configuration maintains sealing continuity between the sealing segments, or a sealing barrier of the assembly, such as when one of the segments is displaced relative to the other during installation of the sealing segments. Using the tongue and groove provides a secondary sealing for the assembly which enables an improved tolerance during installation as compared with conventional segmented sealing assemblies. The configuration of the segmented sealing assembly of the present invention provides effective sealing for large perimeter flanged hardware joints, without the need to apply RTV sealing, or other secondary sealing elements or processes, at the boundaries between adjacent sealing segments.

According to an aspect of the invention, a segmented sealing assembly includes a first sealing segment having a first resilient sealing element with a first primary sealing surface and a tongue having a secondary sealing surface, and a second sealing segment having a second resilient sealing element with a second primary sealing surface and a groove having another secondary sealing surface. The first and second sealing segments are movable into a contact engagement to form the sealing assembly and the first and second sealing segments are moved into the contact engagement. The first and second primary sealing surfaces form a primary seal, and the tongue and the groove form a secondary seal.

According to another aspect of the invention, a method of manufacturing a segmented sealing assembly includes providing a first sealing segment having a first primary sealing component and a tongue having a first sealing surface, providing a second sealing segment having a second primary sealing component and a groove having a second sealing surface, moving the first and second sealing segments into a contact engagement to form the sealing assembly, wherein the first and second primary seal components form a primary seal, and the tongue and the groove form a secondary seal, and using the secondary seal to provide sealing continuity between the first sealing segment and the second sealing segment during any displacement of the first sealing segment and the second sealing segment relative to each other when assembling the first and second sealing segments together.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

The present invention is directed toward a segmented sealing assembly. In general, an exemplary embodiment of the sealing assembly includes a first sealing segment and a second sealing segment, with the first and second sealing segments having opposing mating components that are moved into a contact engagement to form the sealing assembly. The first and second sealing components include a first primary seal component on the first sealing component and a second primary seal component on the second sealing component, wherein the first and second primary seal components form a primary seal when the first and second sealing segments are moved into the contact engagement. The first sealing segment includes a tongue having a first sealing surface and the second sealing segment includes a groove having a second sealing surface which forms a secondary seal when in contact with the tongue. Each of the segments may include both a tongue and a groove such that the sealing segments can be interlocked together.

Figure 1:
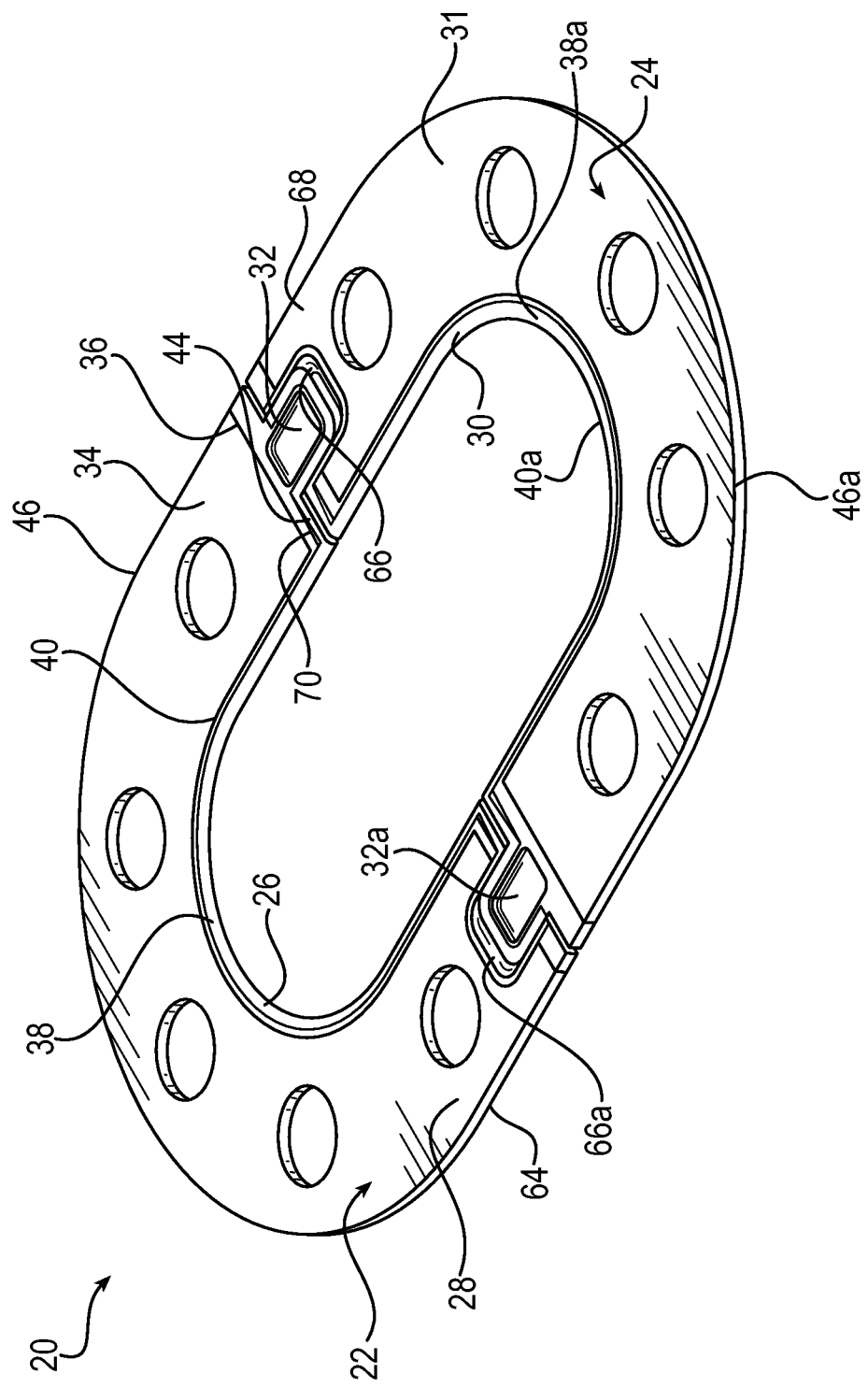
FIG. 1 is a drawing depicting an exemplary segmented sealing assembly in accordance with embodiments of the present invention.
Figure 2:
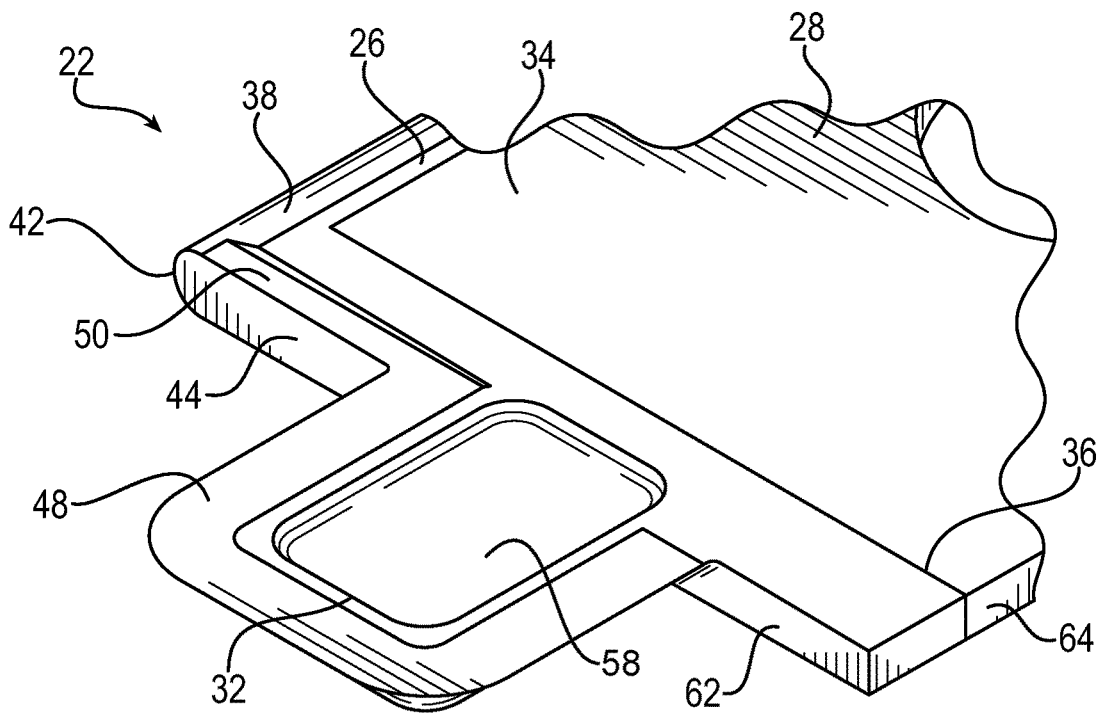
FIG. 2 is a drawing depicting a top view of a segment of the segmented sealing assembly of FIG. 1, showing the segment having a secondary sealing element in the form of a groove.
Figure 3:
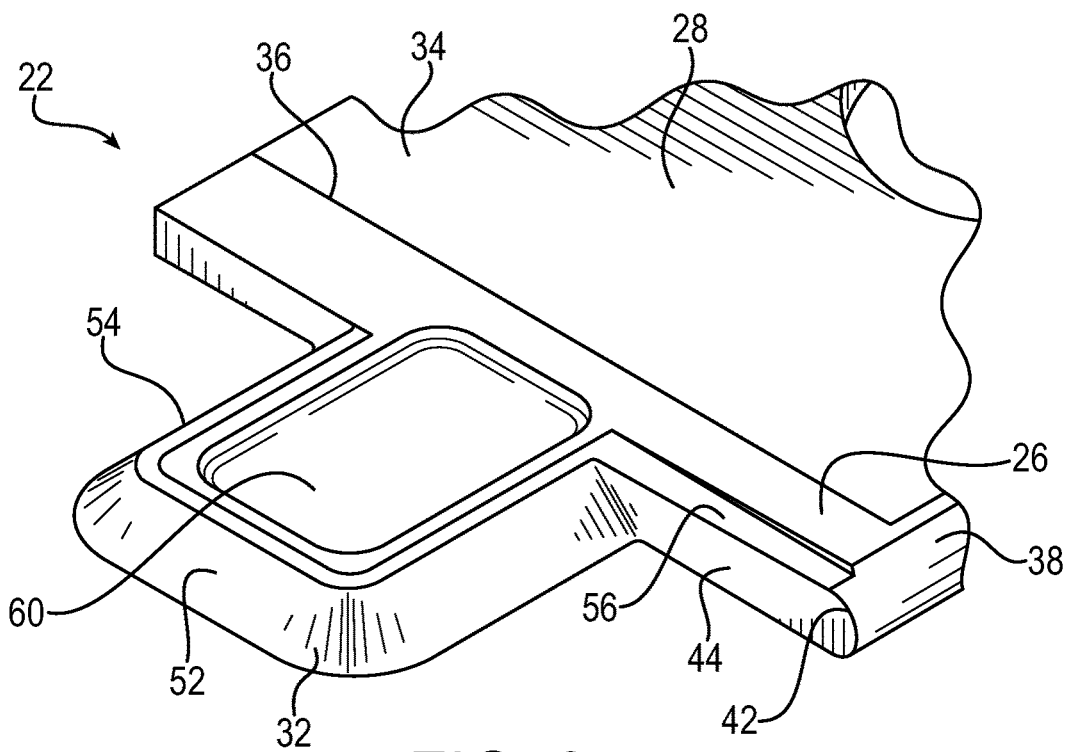
FIG. 3 is a drawing depicting a bottom view of the segment having the groove of FIG. 2.
Figure 4:
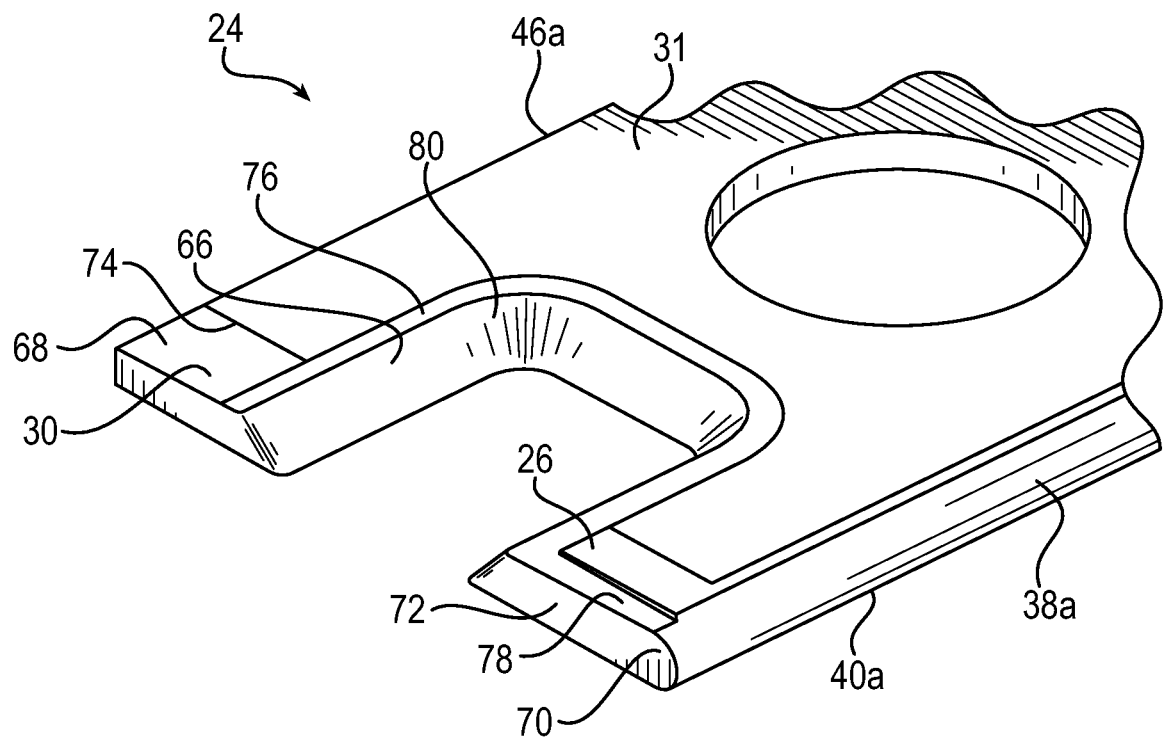
FIG. 4 is a drawing depicting a top view of a segment of the segmented sealing assembly of FIG. 1, showing the segment having a secondary sealing element in the form of a tongue.

FIG. 1 is a drawing depicting an exemplary segmented sealing assembly 20 including a first sealing segment 22 and a second sealing segment 24. FIGS. 2-4 are drawings depicting exemplary portions of the sealing assembly 20 of FIG. 1, with the two sealing segments 22 and 24 being separated for a clearer view of certain features. The first sealing segment 22 includes a resilient member 26 and a rigid retainer element 28. Similarly, the second sealing segment 24 includes a resilient member 30 and a rigid retainer element 31. The sealing segments 22, 24 may be semi-circular or annular in shape and have any suitable radius. The sealing segments 22, 24 may form a closed ring or other closed shape when assembled together. Although the sealing segments 22, 24 are shown as being annular, the sealing segments 22, 24 may have any suitable shape and the shape may be dependent on the application. The sealing segments 22, 24 may be formed to seal around any sort of shape.

In an exemplary application, more than two sealing segments 22, 24 may be used. The first sealing segments may be alternated with second sealing segments along the entire span of the perimeter of the sealing assembly. Alternatively, each sealing segment may be configured comparably having a first end configured as a tongue, and a second end configured as a groove. The sealing segments are then brought together in a contact engagement alternating with a first end joining a second end at each boundary of two segments.

The resilient members 26, 30 may be composed of any suitable elastomeric or other rubber-like compressible material, as are known in art as being suitable for sealing flanged hardware joints. For example, thermoplastic elastomer materials may be suitable. Polyphenylene ether (PPE) may be a suitable material. The resilient members 26, 30 may be over-molded around the retainer elements 28, 31, or otherwise chemically bonded or adhered to the retainer elements 28, 31 by any suitable processes.

The retainer elements 28, 31 may be composed of a rigid or semi-rigid material to provide backing and support for the resilient members 26, 30. For example, the retainer elements 28, 31 may be metal retainers that constitute backing elements to the resilient members 26, 30 for enhanced stiffness and stability of the seal. The retainer elements 28, 31 thus prevent significant extrusion of the resilient members 26, 30 along the flanged hardware joint. In addition, the rigid nature of the metal retainers distributes the load of clamping of the two components of the flanged hardware joint (e.g., clamping a container lid onto a container body) without crushing the resilient members. Suitable reinforced plastics, composites or other suitable rigid materials may be employed in forming the retainers, provided the retainer elements 28, 31 are strong enough to withstand the clamping loads without cracking for a given application.

The resilient members 26, 30 of the sealing segments include opposing mating components that are moved into a contact engagement to form the sealing assembly 20. In exemplary embodiments, the mating components are configured as a tongue on one of the sealing segments and a groove on the other sealing segment. The tongue and the groove have complementary tapered or wedged surfaces that are engageable. Each sealing segment 22, 24 may have a tongue on one end and a groove on the other end for interlocking two sealing segments via two tongue and groove connections between the two sealing segments. In exemplary embodiments, other sealing features may be provided on the sealing segments 22, 24, such as energizing lobes or beads.

As seen in FIGS. 1-3, the resilient member 26, 30 of the first sealing segment 22 and the second sealing segment 24 each include a tongue 32, 32a that protrudes from an end 34 of the corresponding sealing segment 22, 24. The tongue 32 will be described herein with reference to the first sealing segment 22. The second sealing segment 24 has a tongue 32a that is arranged on an opposite side of the sealing assembly 20 relative to the tongue 32 and has features that are similar to the tongue 32 of the first sealing segment 22. The tongues 32, 32a are arranged to extend parallel with each other and in opposite directions, but in the same circular direction, e.g. clockwise or counterclockwise around the sealing assembly 20. Defining the longitudinal direction as the long direction of the sealing assembly 20, and the transverse direction as the short direction perpendicular to the longitudinal direction, the tongues 32, 32a each extend in the longitudinal direction. In other exemplary embodiments, one of the sealing segments 22, 24 may have a tongue at both ends of the corresponding segment 22, 24 and the other of the sealing segments 22, 24 may have a groove at both ends.

The end 34 of the first sealing segment 22 includes an end edge 36 of the rigid retainer element 28 to which the resilient member 26 is affixed. A first primary sealing surface 38 of the resilient member 26 extends around an inner perimeter 40 of the rigid retainer element 28. Although the first sealing segment 22 is shown as being annular, the first sealing segment 22 may have any suitable shape and the shape may be dependent on the application. The first primary sealing surface 38 may extend along an entire length of the inner perimeter 40 to a corner 42 at which a ledge portion 44 of the resilient member 26 extends perpendicular to or nearly perpendicular to the first primary sealing surface 38 along the end edge 36 of the rigid retainer element 28. The ledge portion 44 extends from the inner perimeter 40 of the rigid retainer element 28 to an outer perimeter 46. The first sealing segment 22 has a thin thickness and is planar in shape, and the tongue 32 extends from the ledge portion 44 along the plane of the first sealing segment 22, such that the tongue 32 is flat with the first and second sealing segments 22, 24. Accordingly, the overall transverse thickness of the sealing assembly 20 remains essentially constant.

FIG. 2 shows a detailed view of one side of the tongue 32 and FIG. 3 shows a detailed view of the opposing side of the tongue 32. In an exemplary application, FIG. 2 may show the top side and FIG. 3 may show the bottom side of the sealing assembly 20. The tongue 32 may have any suitable shape, such as a rectangular shape with curved corners. In other exemplary embodiments, the tongue 32 may be circular or annular in shape. The tongue 32 extends perpendicular or nearly perpendicular to the ledge portion 44 of the resilient member 26, opposite to the rigid retainer element 28. As shown in FIG. 2, a first side sealing surface 48 of the tongue 32 may extend and curve around an outer perimeter of the tongue 32. The first side sealing surface 48 is connected to an adjacent sealing surface 50 formed on the ledge portion 44 that is connected to the first primary sealing surface 38, such that the sealing surfaces 38, 48, 50 form a continuous sealing surface along the sealing segment 22. The continuous sealing surface may be a slightly raised surface relative to the rigid retainer element 28.

As best shown in FIG. 3, the tongue 32 has a tapered or wedge surface 52 that tapers from the first side sealing surface 48 to a second side sealing surface 54, such that the wedge surface 52 is angled inwardly from the first side of the tongue 32 to the second side of the tongue 32. The wedge surface 52 slopes longitudinally inward from an upper transverse side, or first side sealing surface 48 down to the lower transverse side, or second side sealing surface 54. The first side sealing surface 48 and the second side sealing surface 54 may be arranged parallel with each other. Similar to the first side sealing surface 48, the second side sealing surface 54 may extend and curve around an outer perimeter of the tongue 32. The second side sealing surface 54 is connected to an adjacent sealing surface 56 formed on the ledge portion 44 that is connected to the first primary sealing surface 38, such that the sealing surfaces 38, 54, 56 form a continuous sealing surface along the first sealing segment 22. The continuous sealing surface may be a slightly raised surface relative to the rigid retainer element 28.

At least one side or both sides of the tongue 32 may have shallow depressions 58, 60 to accommodate for stress in the resilient element 26. For example, in an exemplary application in which the resilient element 26 is formed of a rubber material, stress exerted on the rubber may cause the rubber material to crack. Forming the tongue 32 to have the shallow depressions 58, 60 enables the rubber material to expand when the sealing segments are compressed. The shallow depressions 58, 60 may have any suitable shape and dimensions. For example, the shallow depressions 58, 60 may be rectangular in shape and accommodate most of the surface area of the corresponding bottom or top of the tongue 32. The first side sealing surface 48 may extend around three sides of the shallow depression 58 on the top side and the second side sealing surface 54 may extend around three sides of the shallow depression 60 on the bottom side.

The tongue 32 may have any suitable dimensions. For example, the length of the tongue 32 in the direction of extension may be between 0.5 and 1.5 inches. The width of the tongue 32 in the transverse direction may be less than the length of the tongue 32 in the direction of extension. An outer width of the tongue 32, such as the outer width of the first side sealing surface 48, may be less than the width of the first sealing segment 22. For example, the width of the tongue 32 may extend along a middle portion of the entire width of the first sealing segment 22. The ledge portion 44 may include an inner portion that is arranged on an inner side of the tongue 32 between the tongue 32 and the inner perimeter 40 of the first sealing segment 22. The ledge portion 44 may include an outer portion 62 on an opposite side of the tongue 32. The outer portion 62 of the resilient member 26 may have a sharp corner which is arranged between the ledge portion 44 and the outer perimeter 46 of the first sealing segment 22.

In an exemplary embodiment, the width of the entire first sealing segment 22 may be approximately 4 inches. A width of one end of the first sealing segment 22 may be approximately 1 to 2 inches. An entire length of the first sealing segment 22 from the distal end of the tongue 32 to the opposite end of the first sealing segment 22 may be between 3 and 4 inches. A suitable radius relative to the outer perimeter of the first sealing segment 22 may be approximately 2 inches. A suitable thickness of the rigid retainer element 28 of the first sealing segment 22 may be between 0.055 and 0.065 inches. The second sealing segment 24 may have similar dimensions. The aforementioned dimensions are merely exemplary and many other dimensions may be suitable. The sealing assembly 20 may be sized up or down depending on the application.

Figure 5:
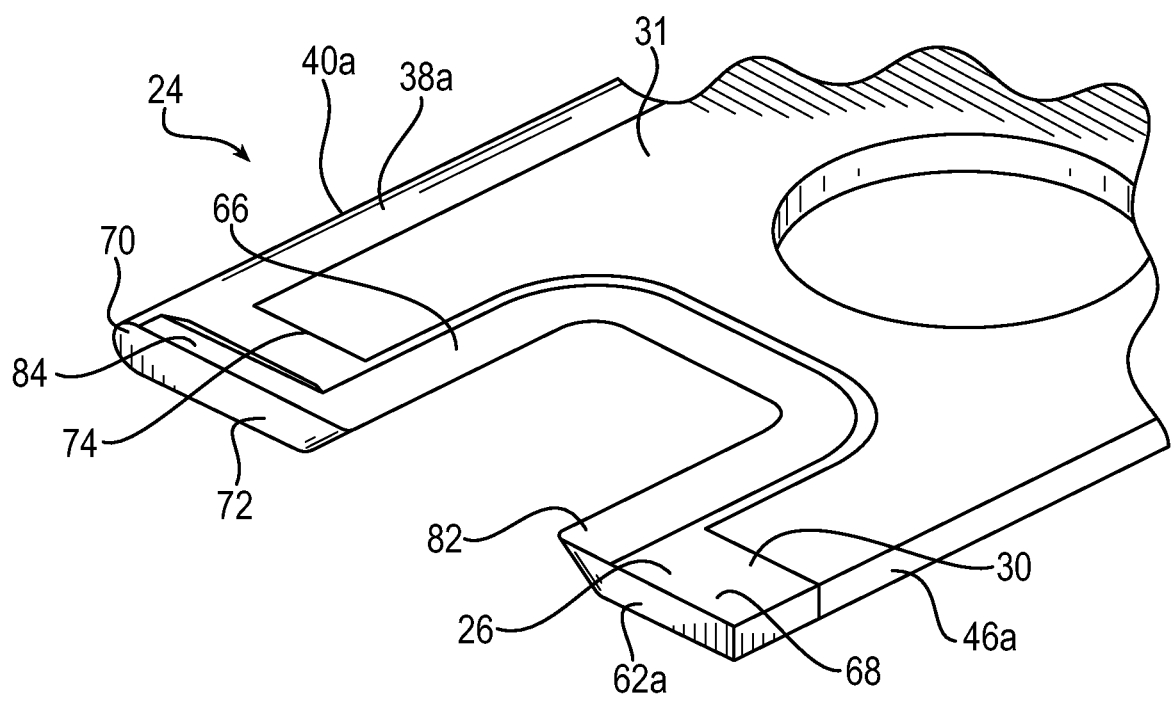
FIG. 5 is a drawing depicting a bottom view of the segment having the tongue of FIG. 4.

As seen in FIGS. 1, 4 and 5, each resilient member 26, 30 of the first sealing segment 22 and the second sealing segment 24 includes a groove 66, 66a that is configured to receive and mate with the tongue 32, 32a on the opposing sealing segment 22, 24. The groove 66 protrudes from an end 68 of the corresponding sealing segment 22, 24 which is adjacent to the end 34 of the adjacent end of the opposite sealing segment 22, 24. The groove 66 will be described herein with reference to the second sealing segment 24 as the tongue 32 of the first sealing segment 22 is configured to mate with the groove 66 of the second sealing segment 22. The first sealing segment 22 has the groove 66a that is arranged on the opposite side of the sealing assembly 20 relative to the groove 66 and has features that are similar to the groove 66. Similar to the tongues 32, 32a, the grooves 66, 66a are arranged to extend parallel with each other and in opposite directions.

The groove 66 extends inwardly from a distal point of the end 68 of the second sealing segment 24. A second primary sealing surface 38a of the resilient member 30 may extend along the entire length of the inner perimeter 40a of the second sealing segment 24 to a corner 70 at which another ledge portion 72 of the resilient member 30 extends perpendicular to or nearly perpendicular to the second primary sealing surface 38a along another end edge 74 of the rigid retainer element 31, as best shown in FIGS. 4 and 5. The ledge portion 72 extends from the inner perimeter 40a of the rigid retainer element 31 to an outer perimeter 46a of the second sealing segment 24, with the groove 66 being defined along the ledge portion 72.

FIG. 4 shows a detailed view of one side of the groove 66 and FIG. 5 shows a detailed view of the opposing side of the groove 66. In an exemplary application, FIG. 4 may show the top side and FIG. 5 may show the bottom side of the sealing assembly 20. The groove 66 may have any suitable shape, such as a rectangular shape with curved corners. In other exemplary embodiments, the groove 66 may be circular or annular in shape. The shape of the groove 66 will have a shape or profile that is complementary to the shape of the tongue 32. As shown in FIG. 4, a first side sealing surface 76 of the groove 66 may extend and curve around an outer perimeter of the groove 66. The first side sealing surface 76 is connected to an adjacent sealing surface 78 formed on the ledge portion 72 that is connected to the first primary sealing surface 38, such that the sealing surfaces 38a, 76, 78 form a continuous sealing surface along the second sealing segment 24. The continuous sealing surface may be a slightly raised surface relative to the rigid retainer element 31.

With further reference to FIG. 5, the groove 66 has a tapered or wedge surface 80 that tapers from the first side sealing surface 76 to a second side sealing surface 82, such that the wedge surface 80 is angled outwardly from the second side, or bottom side, of the tongue groove 66 to the first side, or top side of the groove 66. The first side sealing surface 76 and the second side sealing surface 82 may be arranged parallel with each other. Similar to the first side sealing surface 76, the second side sealing surface 82 may extend and curve around an outer perimeter of the groove 66. The second side sealing surface 84 is connected to an adjacent sealing surface 56 formed on the ledge portion 72 that is connected to the second primary sealing surface 38a, such that the sealing surfaces 38a, 82, 84 form a continuous sealing surface along the sealing segment 22, 24. The continuous sealing surface may be a slightly raised surface relative to the rigid retainer element 31.

The groove 66 may have any suitable dimensions and the dimensions of the groove 66 will correspond to dimensions of the tongue 32. The length of the groove 66 may be between 2 and 3 inches. The width of the groove 66 corresponds to the width of the tongue 32 and the width of the groove 66 may extend along a middle portion of the entire width of the second sealing segment 22, 24. An outer width of the groove 66 may be less than the width of the second sealing segment 24. For example, the width of the groove 66 may extend along a middle portion of the entire width of the second sealing segment 24. The ledge portion 72 may include an inner portion that is arranged on an inner side of the groove 66 between the groove 66 and the inner perimeter 40a of the second sealing segment 24. The ledge portion 72 may include an outer portion 62a on an opposite side of the groove 66. The outer portion 62a may have a sharp corner which is arranged between the ledge portion 72 and the outer perimeter 46a of the second sealing segment 24.

Figure 6:
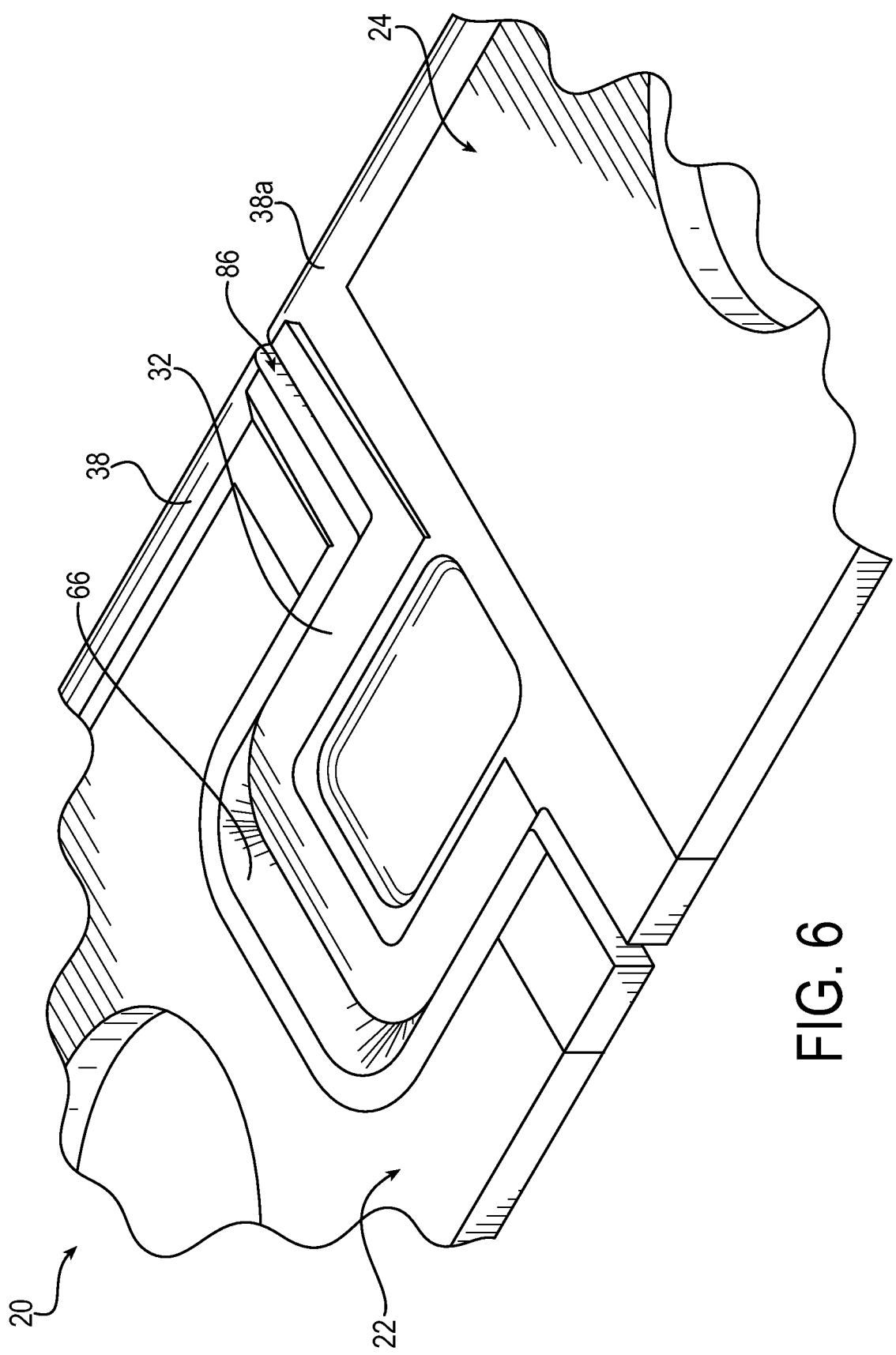
FIG. 6 is a drawing depicting a top view of the connection between adjacent segments in the segmented sealing assembly of FIG. 1.

Referring in addition to FIG. 6, the connection between the tongue 32 and the groove 66 is shown in detail as viewed from a top side of the sealing assembly 20. When the sealing assembly 20 is assembled, the wedge surface 52 of the tongue 32, as shown in FIG. 3, mates with the wedge surface 80 of the groove 66, as shown in FIG. 4. As the wedge surfaces 52, 80 are matching in shape, or complementary, the connection between the tongue 32 and the groove 66 have a press-fit type connection therebetween. The ledge portion 44 of the first sealing segment 22 and the ledge portion 72 of the second sealing segment 24 face each other during assembly of the first sealing segment 22 and the second sealing segment 24. When assembled, the primary sealing surfaces 38, 38a form a primary seal for the sealing assembly 20 and the connection between the tongue 32 and the groove 66 form a secondary seal assembly.

Providing the secondary seal assembly is advantageous in enabling a gap 86 between the first sealing segment 22 and the second sealing segment 24 during installation, such that the sealing assembly 20 has an improved tolerance as compared with conventional sealing assemblies. The gap 86 is between the ledge portions of the sealing segments 22, 24 that face each other when the tongue 32 is inserted in the groove 66. Accordingly, the sealing segments 22, 24 can be assembled to each other at different angles or with gaps between the sealing segments, while also maintaining a continuous seal between the first sealing segment 22 and the second sealing segment 24. Conventional sealing assemblies may use bolts or other fasteners for connecting the sealing segments, but using bolts provides a lower tolerance as compared with using the tongue and groove connection described herein that accommodates for displacement and maintains sealing within the sealing assembly 20.

Figure 7:
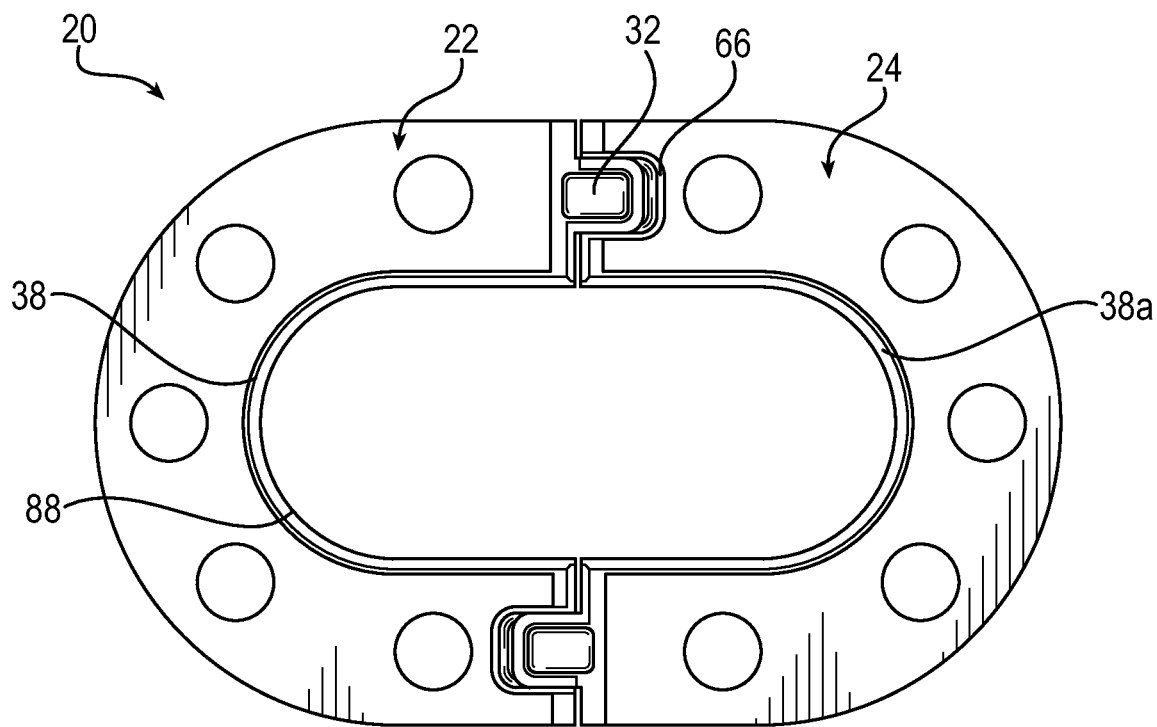
FIG. 7 is a drawing depicting a top view of the segmented sealing assembly of FIG. 1, showing an installation with no displacement between the segments.
Figure 8:
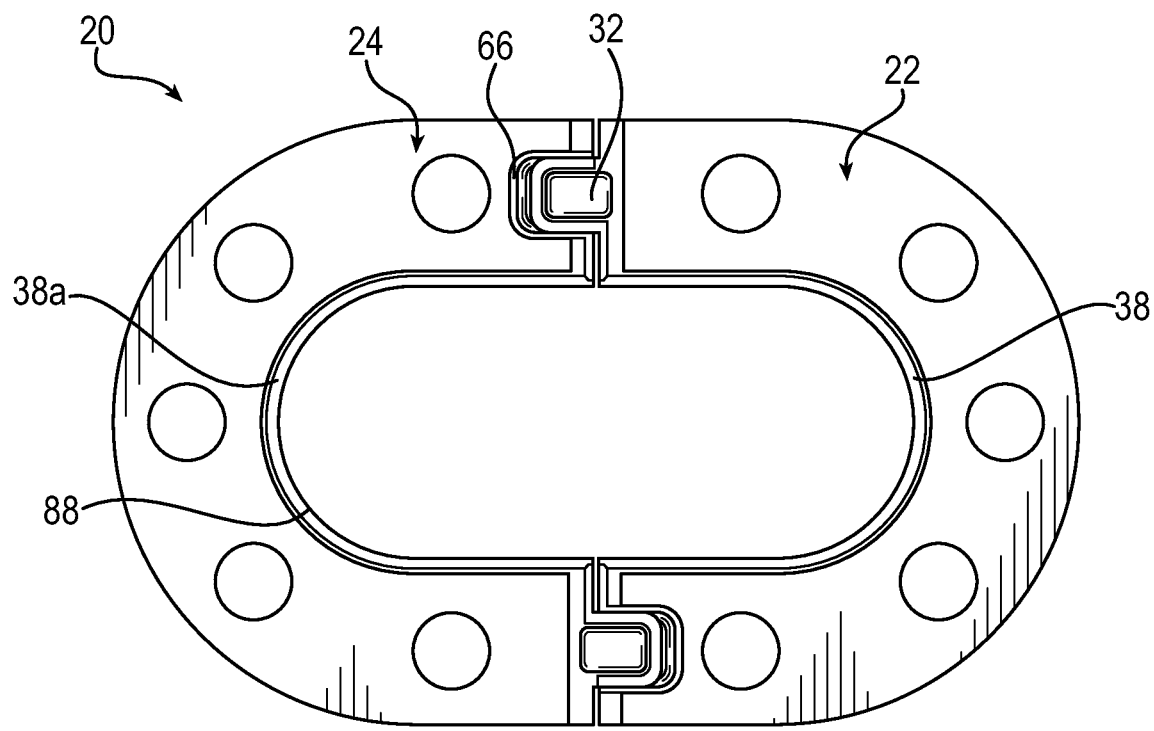
FIG. 8 is a drawing depicting a bottom view of the segmented sealing assembly of FIG. 7.

Referring in addition to FIGS. 7-12, installation of the sealing assembly 20 is shown in which the sealing segments 22, 24 are compressed together. FIGS. 7 and 8 show an ideal installation in which the sealing segments 22, 24 do not have a gap or angle between the sealing segments 22, 24. FIG. 7 shows a top side of the sealing assembly 20 and FIG. 8 shows the bottom side of the sealing assembly 20. During the ideal installation, the primary sealing surfaces 38, 38a of the sealing segments 22, 24 are continuous with each other and form a continuous inner perimeter 88 of the sealing assembly 20. The continuous inner perimeter 88 is a sealing barrier such that there is no pressure leak within the sealing assembly 20. During the ideal installation, the tongue 32 and the groove 66 are mated without any sort of shift or displacement therebetween.

Figure 9:
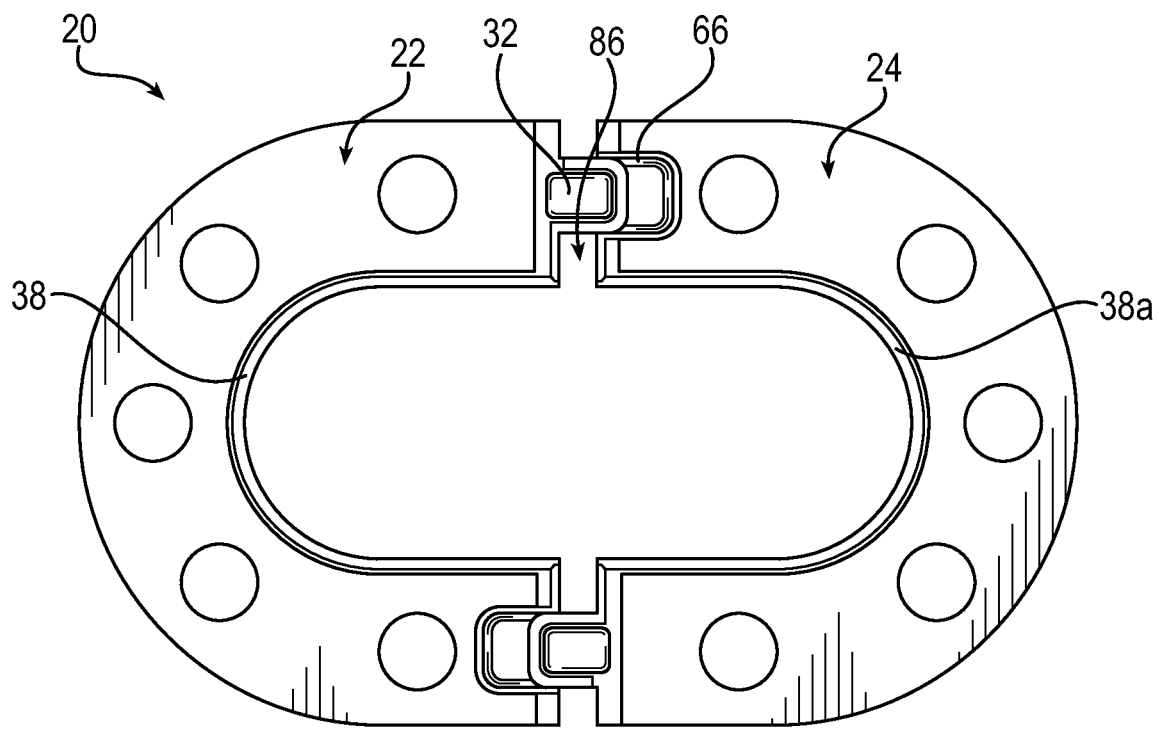
FIG. 9 is a drawing depicting a top view of the segmented sealing assembly of FIG. 1, showing an installation with a gap between the segments.
Figure 10:
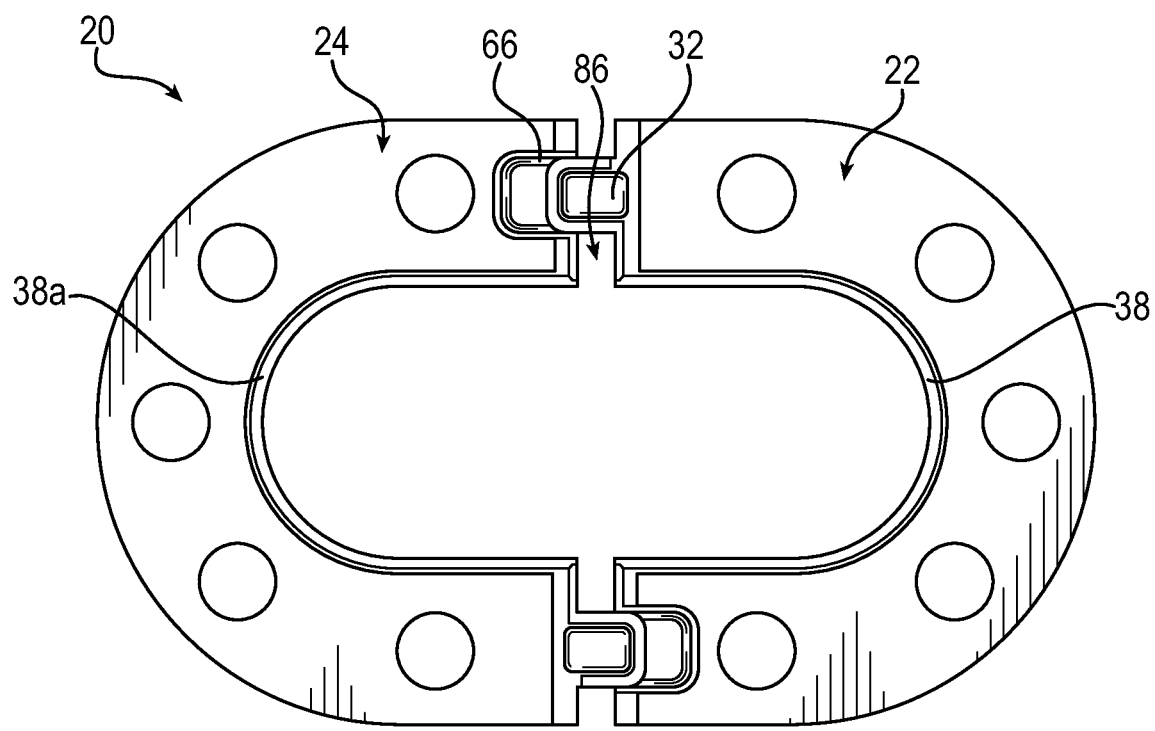
FIG. 10 is a drawing depicting a bottom view of the segmented sealing assembly of FIG. 9.

FIGS. 9 and 10 show an installation in which the gap 86 exists between the sealing segments 22, 24 due to lateral or parallel shifting between the sealing segments 22, 24. The sealing segments 22, 24 are displaced relative to each other in the plane of the sealing assembly 20 such that the sealing segments 22, 24 are not angled relative to the plane. For example, the gap 86 between the sealing segments 22, 24 may be approximately 0.25 inches. As shown in FIGS. 9 and 10, the primary sealing surfaces 38, 38*a* do not form a continuous perimeter therebetween. Using the tongue and groove connection, the sealing barrier remains continuous around the gap 86 between the primary sealing surfaces 38, 38*a*, such that the tongue 32 and the groove 66 provide the secondary sealing between the sealing segments 22, 24 regardless of the gap 86.

Figure 11:
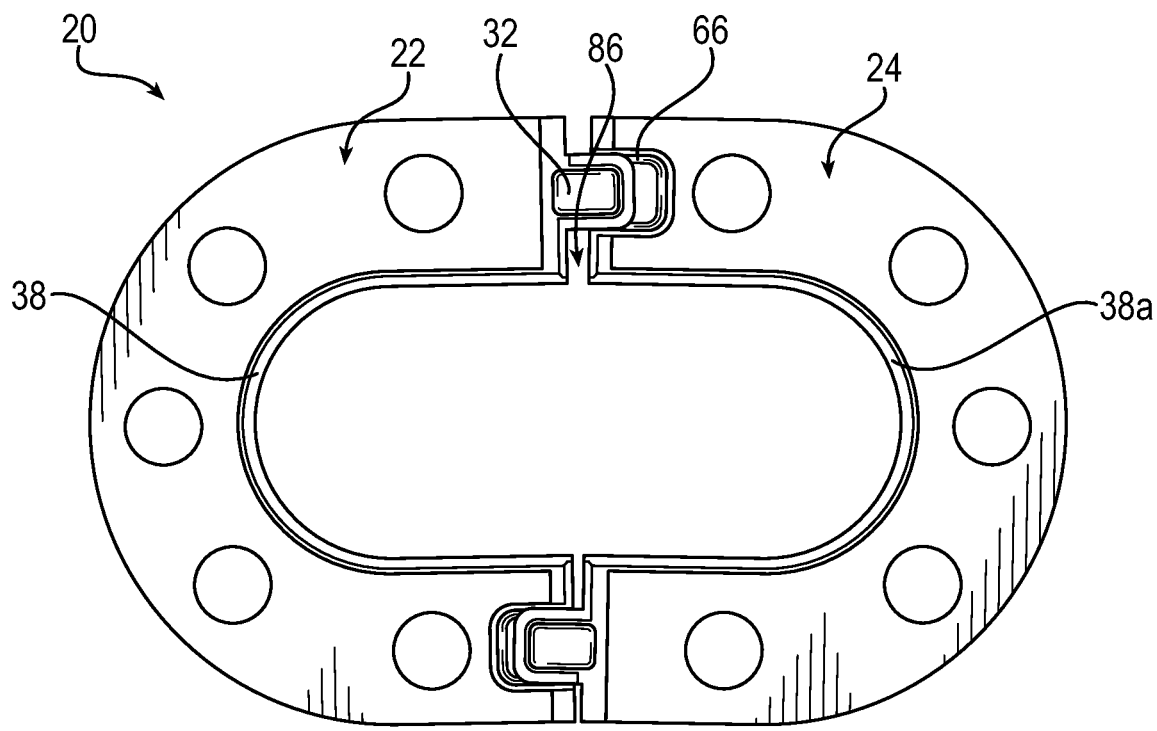
FIG. 11 is a drawing depicting a top view of the segmented sealing assembly of FIG. 1, showing an installation with an angled gap between the segments.
Figure 12:
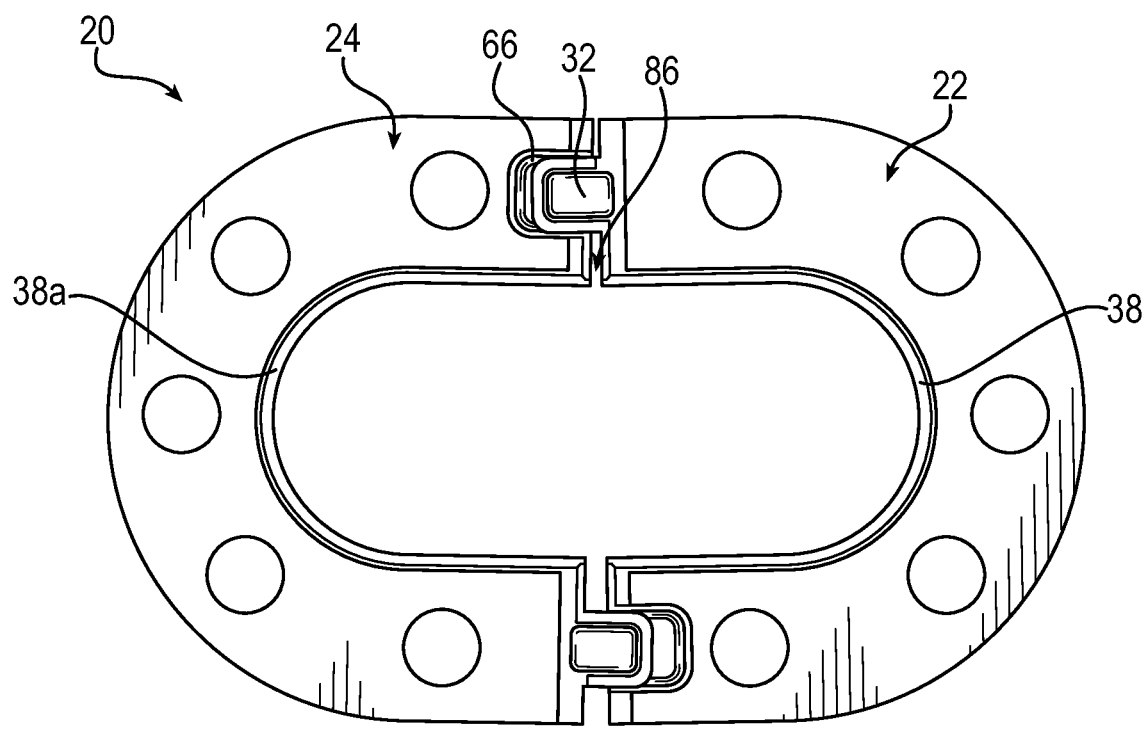
FIG. 12 is a drawing depicting a bottom view of the segmented sealing assembly of FIG. 11.

FIGS. 11 and 12 show an installation in which the gap 86 between the sealing segments 22, 24 is formed due to one or both of the sealing segments 22, 24 being angled relative to the common plane of the sealing segments 22, 24. Similar to the gap 86 shown in FIGS. 9 and 10, the primary sealing surfaces 38, 38*a* do not form a continuous perimeter therebetween. Using the tongue and groove connection, the sealing barrier remains continuous around the gap 86 between the primary sealing surfaces 38, 38*a*, such that the tongue 32 and the groove 66 provide the secondary sealing between the sealing segments 22, 24 regardless of the gap 86. Thus, using the tongue and groove connection advantageously maintains the sealing barrier between the sealing segments 22, 24 and prevents leakage in the system. The configuration of the present segmented sealing assembly 20, therefore, provides enhanced sealing as compared to conventional segmented seal configurations, and without the use of RTV or like processes.

Figure 13:
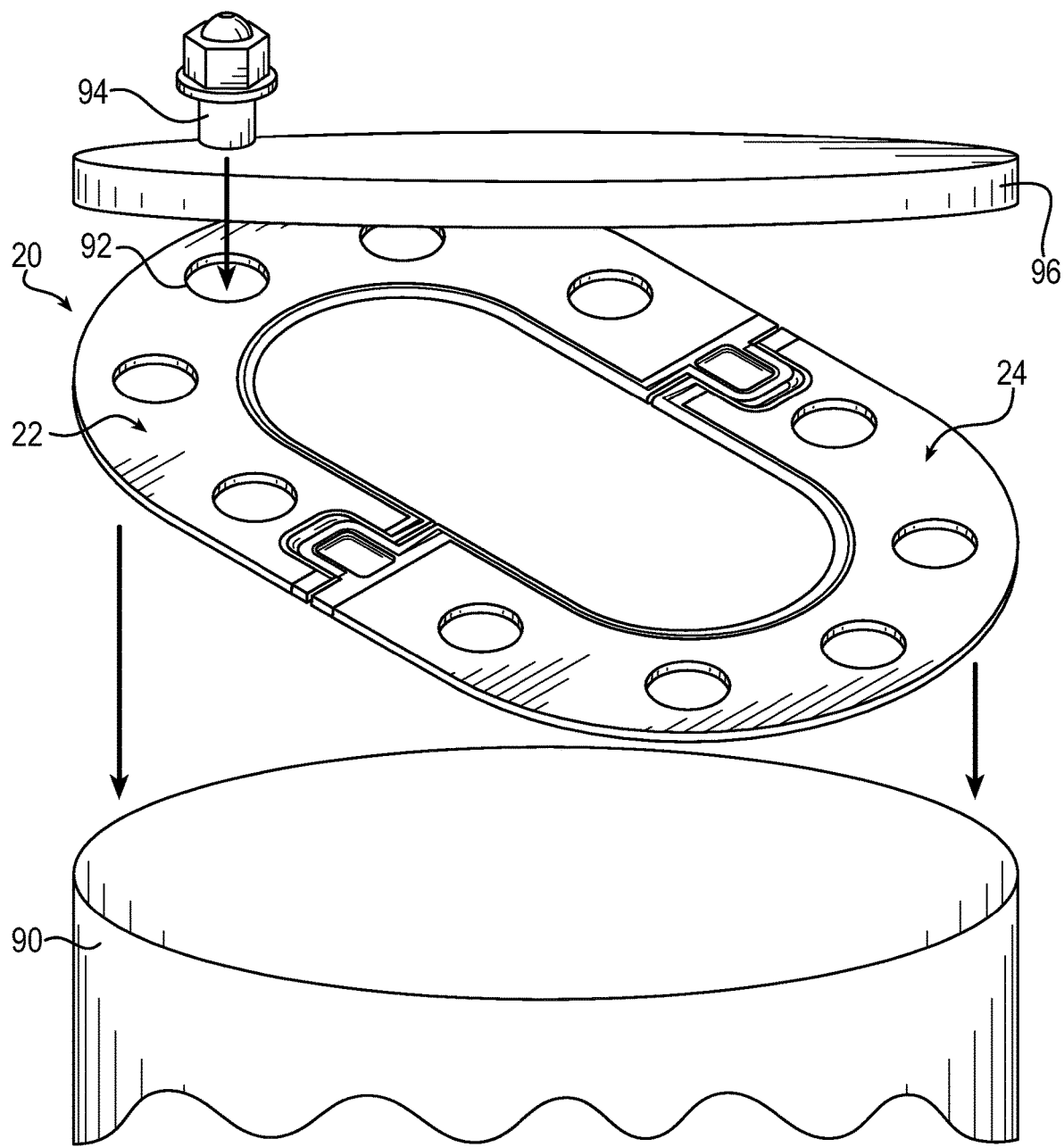
FIG. 13 is a drawing depicting a container and lid between which the segmented sealing assembly is interposed.

FIG. 13 schematically shows an exemplary usage of the segmented sealing assembly 20 for sealing of a cylindrical container 90. Other non-cylindrical containers may be suitable as the segmented sealing assembly 20 may be formed to seal around any shape. It will be appreciated, however, that the use of the present invention is not limited to this example, but comparable principles may be applied to the sealing of any large-perimeter flanged hardware joint. The configuration of the present invention is particularly suitable for very large ports or openings (e.g., several feet in perimeter or diameter) requiring a sealing element, for static face sealing for low pressure applications. This configuration further eliminates the traditional need to apply RTV sealing at boundaries between adjacent sealing segments at their location of contact engagement.

The exemplary container 90 may have an end or rim of which may constitute a first joint component of a flanged hardware joint to be sealed. In FIG. 13, the sealing assembly 20 in accordance with embodiments of the present application has not yet been installed along the rim or end of the container body. The sealing assembly 20 includes alternating sealing segments to form an overall sealing assembly with a closed perimeter configuration. In other words, the sealing assembly 20 extends entirely around the perimeter of the container body in a segmented fashion to form a closed ring. Each rigid retainer element of the sealing segments 22, 24 includes at least one fastening hole 92 for receiving any suitable fastener 94, which enables fastening of the sealing assembly 20 to the container 90. The fasteners 94 will be secured after positioning of the sealing assembly 20.

In an exemplary embodiment, the container body may be a first joint component, and an additional container lid 96 may form a second joint component that, in combination with the body of the container 90, defines a flanged hardware joint. In such an embodiment, the sealing assembly 20 may be used to seal the flanged hardware joint between the body of the container 90 and the container lid 96. As the fasteners 94 are tightened, the sealing assembly 20 is compressed transversely between the body of the container 90 and the container lid 96.

A segmented sealing assembly includes a first sealing segment having a first resilient sealing element with a first primary sealing surface and a tongue having a secondary sealing surface, and a second sealing segment having a second resilient sealing element with a second primary sealing surface and a groove having another secondary sealing surface. The first and second sealing segments are movable into a contact engagement to form the sealing assembly and the first and second sealing segments are moved into the contact engagement. The first and second primary sealing surfaces form a primary seal, and the tongue and the groove form a secondary seal.

The first sealing segment and the second sealing segment may form a continuous seal therebetween when moved into the contact engagement.

The first primary sealing surface and the secondary sealing surface may be continuous with each other on the first sealing segment, and the second primary sealing surface and the other secondary sealing surface may be continuous with each other on the second sealing segment.

The groove may have a groove profile that is complementary in shape to a tongue profile of the tongue.

The tongue and the groove may be parallel to each other.

The tongue and the groove may have tapered or wedge surfaces that are engageable with each other.

Each of the first sealing segment and the second sealing segment may include a tongue and a groove that are engageable with another tongue and another groove of the other of the first sealing segment and the second sealing segment.

The tongue and the groove may be rectangular in shape.

The first sealing segment and the second sealing segment may extend longitudinally in a common plane and have a constant transverse thickness.

The tongue may extend from a main body of the first sealing segment and in the common plane.

The tongue may have a top surface and a bottom surface opposing the top surface.

Each of the top surface and the bottom surface may have a shallow depression.

Each of the top surface and the bottom surface may have a secondary sealing surface.

The groove may be defined by a top surface and a bottom surface opposing the top surface, and each of the top surface and the bottom surface may have a secondary sealing surface.

The resilient elements may be formed of an elastomer material.

The first primary sealing component may be located on an inner perimeter of the first sealing segment and the second primary sealing component may be located on an inner perimeter of the second sealing segment.

Each sealing segment may comprise a rigid retainer element.

A sealing assembly may comprise alternating first and second sealing segments that are configured to form a closed perimeter sealing assembly.

A method of manufacturing a segmented sealing assembly includes providing a first sealing segment having a first primary sealing component and a tongue having a first sealing surface, providing a second sealing segment having a second primary sealing component and a groove having a second sealing surface, moving the first and second sealing segments into a contact engagement to form the sealing assembly, wherein the first and second primary seal components form a primary seal, and the tongue and the groove form a secondary seal, and using the secondary seal to provide sealing continuity between the first sealing segment and the second sealing segment during any displacement of the first sealing segment and the second sealing segment relative to each other when assembling the first and second sealing segments together.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A segmented sealing assembly comprising:
    a first sealing segment having a first resilient sealing element with a first primary sealing surface and a tongue having a secondary sealing surface; and
    a second sealing segment having a second resilient sealing element with a second primary sealing surface and a groove having another secondary sealing surface, wherein the first and second sealing segments are movable into a contact engagement to form the sealing assembly,
    wherein when the first and second sealing segments are moved into the contact engagement, the first and second primary sealing surfaces form a primary seal, and the tongue and the groove form a secondary seal; and
    wherein the first sealing segment and the second sealing segment are configured to engage in the contact engagement at different angles to form a continuous seal therebetween.

2. The segmented seal assembly of claim 1 wherein the first primary sealing surface and the secondary sealing surface are continuous with each other on the first sealing segment, and the second primary sealing surface and the other secondary sealing surface are continuous with each other on the second sealing segment.

3. The segmented seal assembly of claim 1, wherein the groove has a groove profile that is complementary in shape to a tongue profile of the tongue.

4. The segmented seal assembly of claim 1, wherein the tongue and the groove are parallel to each other.

5. The segmented seal assembly of claim 1, wherein the tongue and the groove have tapered or wedge surfaces that are engageable with each other.

6. The segmented seal assembly of claim 1, wherein each of the first sealing segment and the second sealing segment includes a tongue and a groove that are engageable with another tongue and another groove of the other of the first sealing segment and the second sealing segment.

7. The segmented seal assembly of claim 1, wherein the tongue and the groove are rectangular in shape.

8. The segmented seal assembly of claim 1, wherein the first sealing segment and the second sealing segment extend longitudinally in a common plane and have a constant transverse thickness.

9. The segmented seal assembly of claim 8, wherein the tongue extends from a main body of the first sealing segment and in the common plane.

10. The segmented seal assembly of claim 8, wherein the tongue has a top surface and a bottom surface opposing the top surface.

11. The segmented seal assembly of claim 10, wherein each of the top surface and the bottom surface has a shallow depression.

12. The segmented seal assembly of claim 9, wherein each of the top surface and the bottom surface has a secondary sealing surface.

13. The segmented seal assembly of claim 9, wherein the groove is defined by a top surface and a bottom surface opposing the top surface, wherein each of the top surface and the bottom surface has a secondary sealing surface.

14. The segmented seal assembly of claim 9, wherein the resilient elements are formed of an elastomer material.

15. The segmented sealing assembly of claim 9, wherein the first primary sealing component is located on an inner perimeter of the first sealing segment and the second primary sealing component is located on an inner perimeter of the second sealing segment.

16. The sealing assembly of claim 9, wherein each sealing segment comprises a rigid retainer element.

17. A sealing assembly comprising alternating first and second sealing segments according to claim 9, wherein the alternating first and second sealing components are configured to form a closed perimeter sealing assembly.

18. A method of manufacturing a segmented sealing assembly, the method comprising:
    providing a first sealing segment having a first primary sealing component and a tongue having a first sealing surface;
    providing a second sealing segment having a second primary sealing component and a groove having a second sealing surface;
    moving the first and second sealing segments into a contact engagement to form the sealing assembly, wherein the first and second primary seal components form a primary seal, and the tongue and the groove form a secondary seal; and
    using the secondary seal to provide sealing continuity between the first sealing segment and the second sealing segment during any angular displacement of the first sealing segment and the second sealing segment relative to each other when assembling the first and second sealing segments together.

* * * * *